United States Patent [19]
Norkus et al.

[11] Patent Number: 6,095,481
[45] Date of Patent: Aug. 1, 2000

[54] BREAKAWAY SHOCK ISOLATING MOUNT

[75] Inventors: James Norkus; William J. Curley, Jr., both of Waterbury, Conn.

[73] Assignee: Illinois Tool Works, Inc., Glenview, Ill.

[21] Appl. No.: 09/306,766

[22] Filed: May 7, 1999

[51] Int. Cl.[7] .................................................. F16M 13/00
[52] U.S. Cl. .......................... 248/560; 248/635; 248/638; 248/562
[58] Field of Search .................................... 248/560, 635, 248/561, 562, 564, 602, 638; 225/94, 92, 93, 96, 96.5

[56] References Cited

U.S. PATENT DOCUMENTS

| | | | |
|---|---|---|---|
| 5,295,671 | 3/1994 | Nakagaki et al. | 248/638 X |
| 6,003,897 | 12/1999 | Dostert et al. | 248/638 X |

*Primary Examiner*—Leslie A. Braun
*Assistant Examiner*—A. Joseph Wujciak
*Attorney, Agent, or Firm*—St. Onge Steward Johnston & Reens LLC

[57] ABSTRACT

An improved shock isolating mount for securing a body part of a vehicle to a support is provided. The shock mount includes a two-part spool having: a spacer formed from an annular flange integral with a tube, the tube projecting through apertures in mating elastically resilient bodies and a mounting part of a vehicle body part disposed between them; and a thimble, formed from a flange integral with a tube designed such that the thimble tube can telescope into the spacer tube. The thimble tube is formed into a polygon shape at the tube shoulder adjacent the thimble flange and the spacer tube is formed in a matching polygon shape such that the thimble tube shoulder can mate with the spacer tube. The thimble tube has an enlarged end which is engaged by a plurality of inward protrusions mounted in the spacer tube to prevent the spacer and thimble assembly from accidental engagement. The thimble tube is internally threaded to engage a threaded fastener inserted through the support, through the spool tube, and into the thimble tube. Passing through the thimble flange surrounding the thimble tube are a plurality of perforations. Although the perforations preferably take the form of circular holes, they may be formed as elongated slots, curved elongated slots, or any of numerous other shapes, which extend through the thimble flange. The perforations are preferably equally spaced radially about the thimble tube.

11 Claims, 3 Drawing Sheets

BREAKAWAY SHOCK ISOLATING MOUNT

FIELD OF THE INVENTION

The present invention relates to an improved shock isolating mount for securing a heavy structure, such as a vehicle body, to a support, such as the frame of a vehicle, and absorbing vibrations or shocks between the two structures.

BACKGROUND OF THE INVENTION

A shock mount currently used in the automotive industry to secure vehicle bodies to vehicle frames is disclosed in U.S. Pat. Nos. 4,783,039 and 4,720,075 to Peterson et al, the disclosures of which are hereby incorporated by reference. This shock mount has been successful in the industry due to its design features which provide a telescoping metal spacer and metal thimble assembly that snap together to hold the thimble and spacer together until secured with a threaded fastener, and in which the thimble and spacer have mating surfaces to prevent either one from rotating relative to the other, thereby permitting fastening of the threaded fastener with minimal undesirable rotation of one element relative to the other.

While this known shock mount is exceptionally effective and has high strength characteristics, it does not allow for variations in strength requirements. For example, in some instances an automotive or truck manufacturer may specify that the shock mount will not separate in a barrier test, i.e., that the shock mount will not separate when the vehicle in which it is used impacts a barrier at a certain speed. In other instances, the vehicle manufacturer may specify that the shock mount will separate during a barrier test at certain speeds. Such a specification can arise when the vehicle manufacturer is designing crash protection features in which the energy of a crash is dissipated by destruction or separation of various components of the vehicle body. In such case, each shock mount must be separately designed and manufactured, increasing product cost.

These problems were addressed by the shock mount disclosed in U.S. Pat. No. 5,570,067 to Peterson et al, the disclosure of which is hereby incorporated by reference. This shock mount includes interfitting flanged spacer and thimble members and resilient rings mounted thereto. The thimble is formed from a hollow plastic stem and a metal base. The metal base includes a flange and an internally threaded post. The thimble stem fits over and snaps onto the post. The metal base member is made in either a high strength or low strength configuration. Selection of the appropriate configuration of base member provides a shock mount assembly of the desired separation strength.

While this shock mount design provides some flexibility as to the separation strength, in that either the high strength or the low strength configuration can be used, accommodating multiple separation strengths would require that base members having multiple configurations be manufactured. Such a process would require design work to determine appropriate configurations for the desired separation strength and retooling of the manufacturing machinery to produce such configurations, thereby increasing cost of production. Moreover, even after the appropriate design configuration is determined, variations in material gauge and chemistry may greatly affect the separation strength. Thus, two shock mounts having the same configuration may separate at widely varying impact forces.

What is desired therefore is a shock mount which has the capability to be used in both the fixed and breakaway applications described above, which allows for selectivity of the force required for separation, which is economic to produce, and which reliably separates at the desired impact force.

SUMMARY OF THE INVENTION

Accordingly, it is an object of the present invention to provide a shock mount which has the capability to be used in both fixed and breakaway applications.

Another object of the present invention is to provide a shock mount which allows for selectivity of the force required for separation.

A further object of the present invention is to provide a shock mount which is economic to produce.

Still another object of the present invention is to provide a shock mount which reliably separates at the desired impact force.

These and other objects of the present invention are achieved by provision of a shock mount having a two-part spool comprising a spacer and a thimble. The spacer includes an annular flange and integral tube projecting perpendicularly from the flange. The spacer tube is inserted through apertures in mating elastically resilient rings with the mounting part of a vehicle body disposed between the resilient rings.

The thimble includes an annular flange and integral tube projecting perpendicularly from the flange. The thimble tube is receivable inside and displaceable axially relative to the spacer tube, such that the spacer and thimble can telescope together. The thimble tube is engaged by an elongated fastening device which has a head and shank. The shank portion of the elongated fastening device is inserted through an opening in the support, up through the center of the spacer tube, and into the engaging means of the thimble tube. Manipulation of the fastening device draws the thimble tube into the spacer tube and thereby causes the flanges of the spacer and thimble members to compress the mating elastically resilient rings and the body part disposed between the rings, and simultaneously secures the shock mount to a support disposed between the spacer flange and the head portion of the elongated fastener. The elongated fastening device will usually comprise a screw threaded fastener, such as a carriage bolt, and will be engaged by screw threading tapped on the inside of the thimble tube.

Passing through the thimble flange surrounding the thimble tube are a plurality of perforations. Although the perforations preferably take the form of circular holes, they may be formed as elongated slots, curved elongated slots, or any of numerous other shapes. The perforations are preferably equally spaced radially about the thimble tube, although such placement is not required.

The spacer tube is formed at its axial end opposite the spacer flange into a polygon, as viewed in cross-section. The thimble tube is formed at the tube shoulder adjacent the thimble flange into a complementary polygonal shape, so that the thimble polygon formation can be received in the spacer polygon formation, preventing rotation of the two members relative to each other.

The two-part spool further includes coacting means for preventing separation of the spacer and thimble members when the thimble tube is received in the spacer tube. The coacting means may be formed from a plurality of inward protrusions inside the spacer tube which engage an enlarged end on the thimble tube.

The shock mount is assembled by inserting the spacer tube through the center of the mating elastically resilient rings and the body mounting part positioned between them, placing the end of the thimble tube into the spacer tube and applying sufficient force for the thimble tube enlarged end to be engaged by the spacer tube inward protrusions. The body part and assembled spool and mating rings are then seated in place on the support, and the threaded fastener is passed up through an opening in the support, through and coaxially with the center of the spool parts and is engaged by the internal threading of the thimble. The threaded fastener is tightened, drawing the thimble flange towards the support, causing the spool parts to telescope together so that the spool flanges compress the resilient rings against the body part so that the body part is secured, and also securing the spool and mating ring assembly and associated body part to the support.

When the threaded fastener is tightened, and the shock isolating mount firmly secured, the clamping load is borne by the spacer tube and the resilient rings. The spool and thimble telescope together to maintain an even distribution of the clamping load.

The design of the spacer tube polygon shape portion and matching thimble tube polygon shoulder prevents independent rotation by either part relative to the other. Accidental disassembly of the spacer and thimble is prevented by the locking effect of the thimble tube enlarged and engaged by the plurality of inward protrusions on the spacer tube.

The perforations passing through the thimble flange define a fracture line along the webs of the thimble flange between the perforations. When an impact force is applied which exceeds the separation strength, the forces are concentrated along the fracture line, which results in the fracture of the webs and separation of the structure and the support. The separation strength can be selected by varying the size of, number of, position of, shape of, location of, or spacing of the perforations.

The invention and its particular features and advantages will become more apparent from the following detailed description considered with reference to the accompanying drawings.

DETAILED DESCRIPTION OF THE INVENTION

Figure 1:
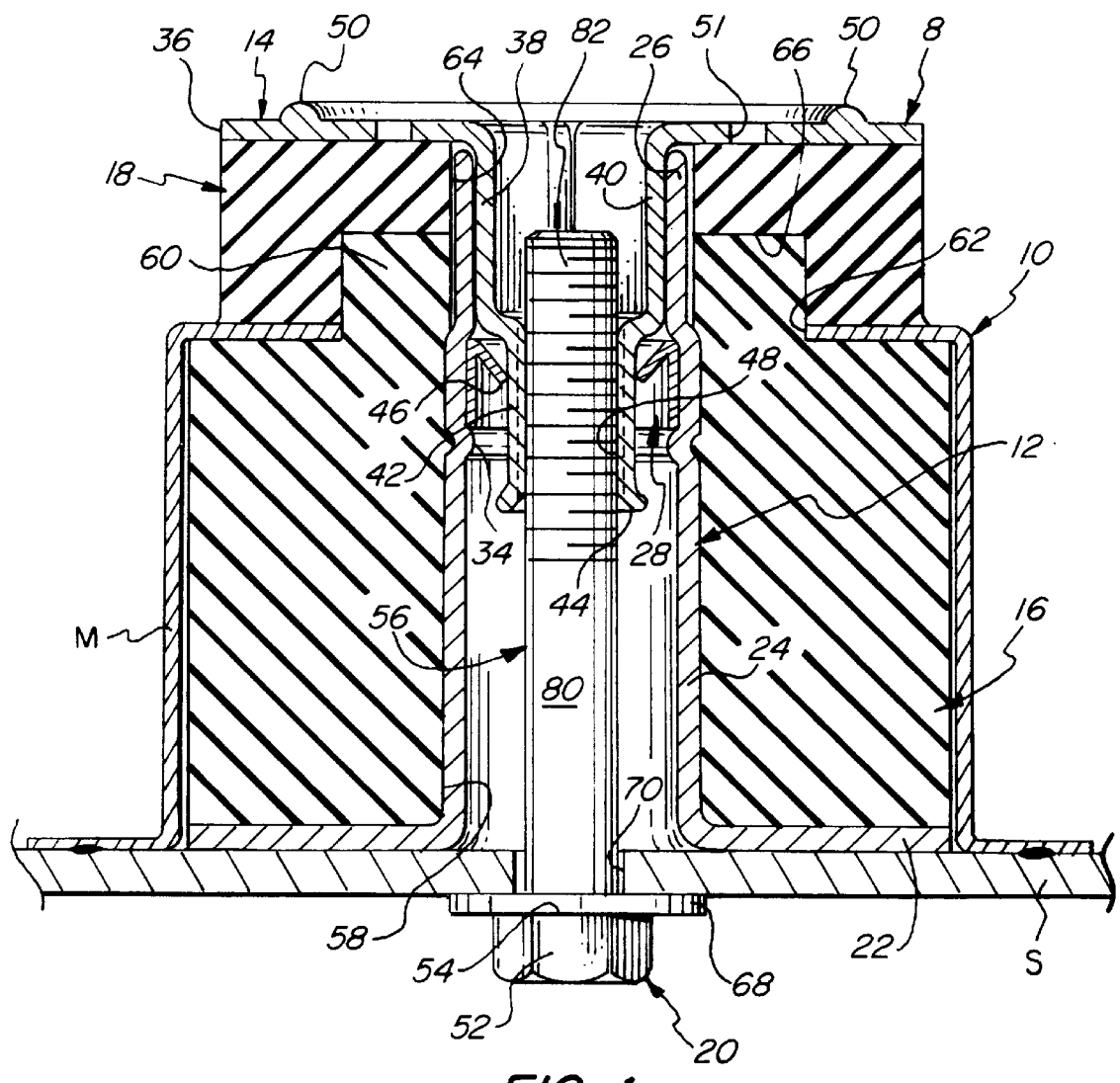
FIG. 1 is a side cross-sectional view of the assembled shock isolating mount.
Figure 2:
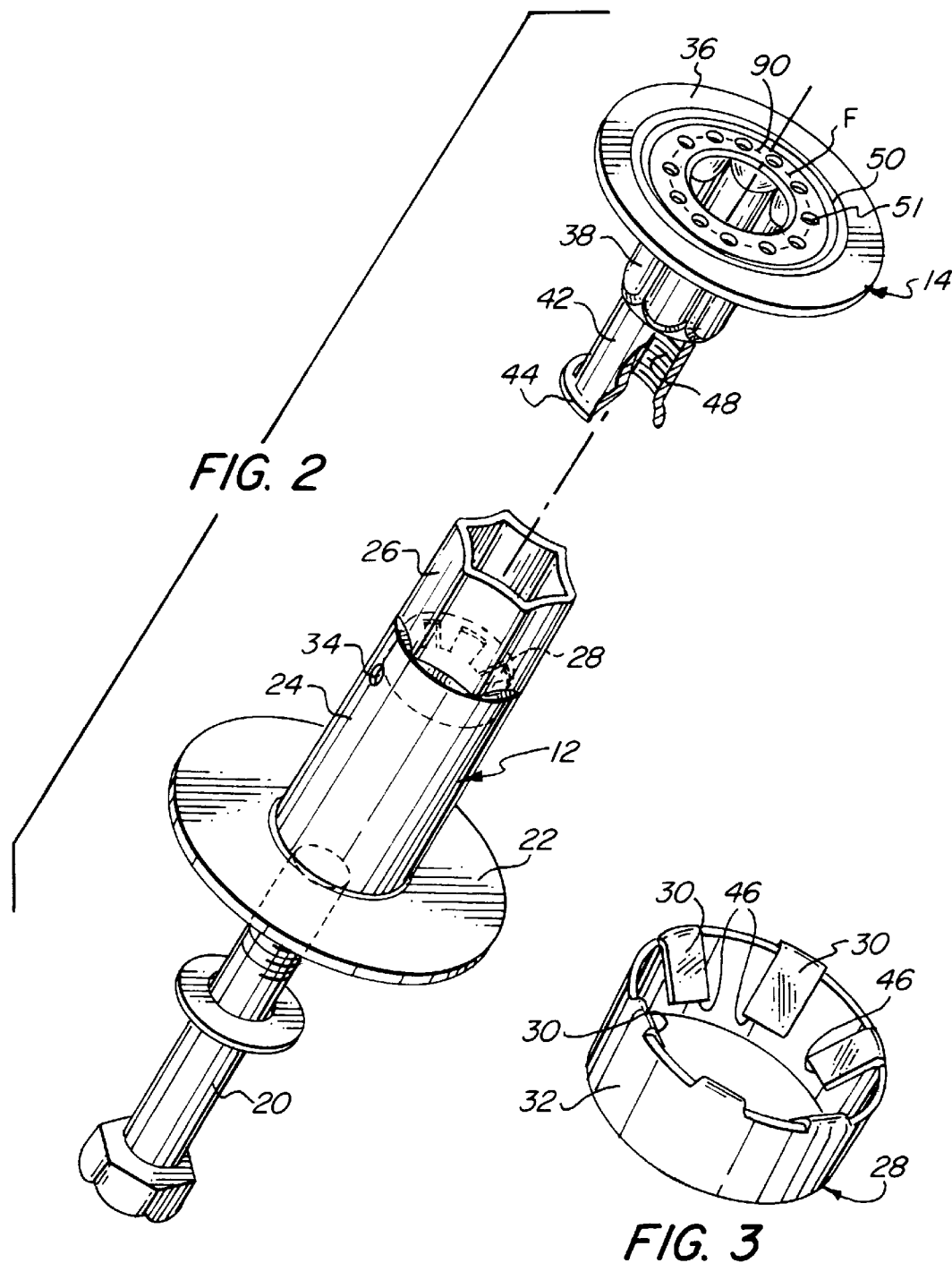
FIG. 2 is an exploded perspective view of the spacer and thimble components oriented for assembly.
Figure 3:
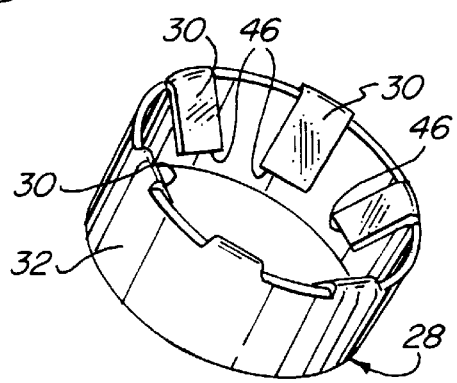
FIG. 3 is a perspective view of an embodiment of the plurality of inward protrusions.

Referring first to FIGS. 1, 2, and 3 an isolator assembly in accordance with the present invention is shown, generally indicated at 10. Isolator assembly 10 includes a two-part spool, generally indicated 8, which includes a spacer, generally indicated at 12, a thimble, generally indicated at 14, a first elastically resilient mating ring, generally indicated at 16, a second elastically resilient mating ring, generally indicated at 18, and a threaded fastener, generally indicated at 20. Spacer 12, shown in FIGS. 1 and 2, includes an annular flange 22 integral with a tube 24 extending perpendicularly from the flange 22. Spacer tube 24, for a portion of its axial end opposite the spacer flange 22, is formed into a polygon when viewed in axial cross-section, shown as a hexagon portion 26. The spacer tube 24 further includes a plurality of inward protrusions which is shown as a six tab washer 28. The plurality of inward protrusions is further shown in FIG. 3 as a six tab washer which has tabs 30 bent to an angle approximately 45 degrees from the washer body 32, such that when positioned in the spacer tube, the tabs are generally oriented towards the spacer flange 22. The six tab washer 28 is held in place at the spacer tube end 26 opposite the spacer flange 22 by the constriction of the tube caused by forming a portion of the tube end into a hexagon 26. The six tab washer 28 is held in place at the spacer flange end by two indents 34 in the spacer tube wall.

Inserted into the spacer 12 is the thimble 14. The thimble 14 includes an annular thimble flange 36 integral with a thimble tube 38. The thimble flange 36 is formed with a raised ring 50 located on the axial face opposite the thimble tube 38. The thimble tube 38 has two distinct portions 40 and 42. The tube shoulder portion 40 located between the thimble flange 36 and tube cylindrical portion 42 is formed into a polygon shape when viewed in axial cross-section, which in the preferred embodiment is a hexagon. The hexagon shoulder 40 is congruent with the shape of the spacer tube portion 26, but has a perimeter slightly less than the perimeter of the interior of the hexagon portion 26, such that each piece engages the other, and neither the spacer nor the thimble will rotate relative to each other.

Figure 4:
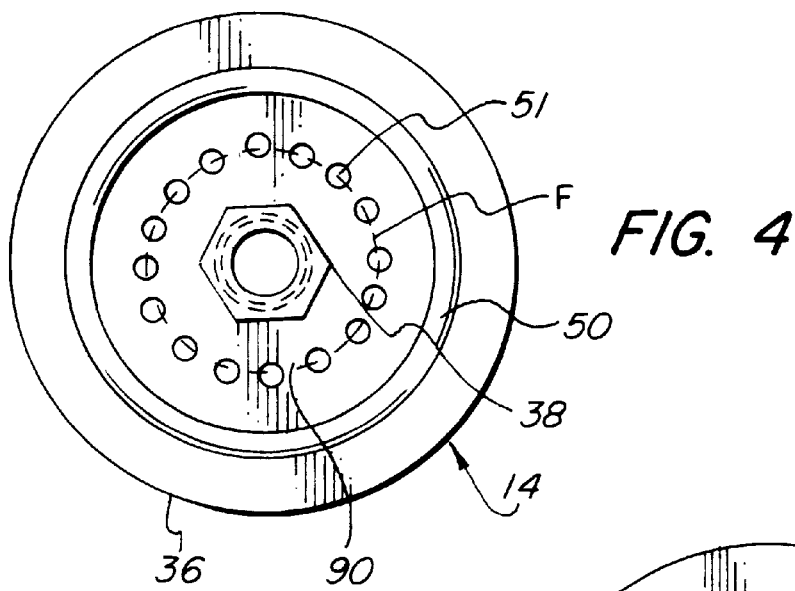
FIG. 4 is an end plan view of an embodiment of the thimble having circular perforations.
Figure 5:
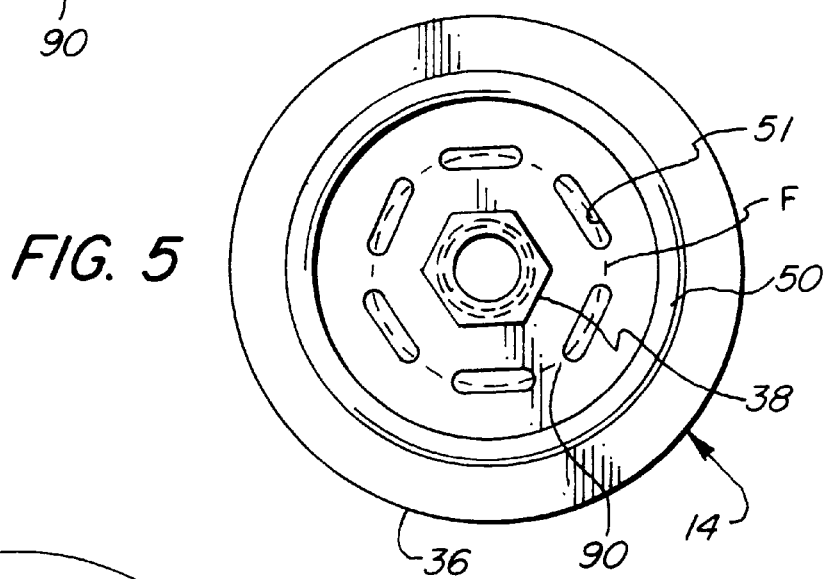
FIG. 5 is an end plan view of an embodiment of the thimble having elongated perforations.
Figure 6:
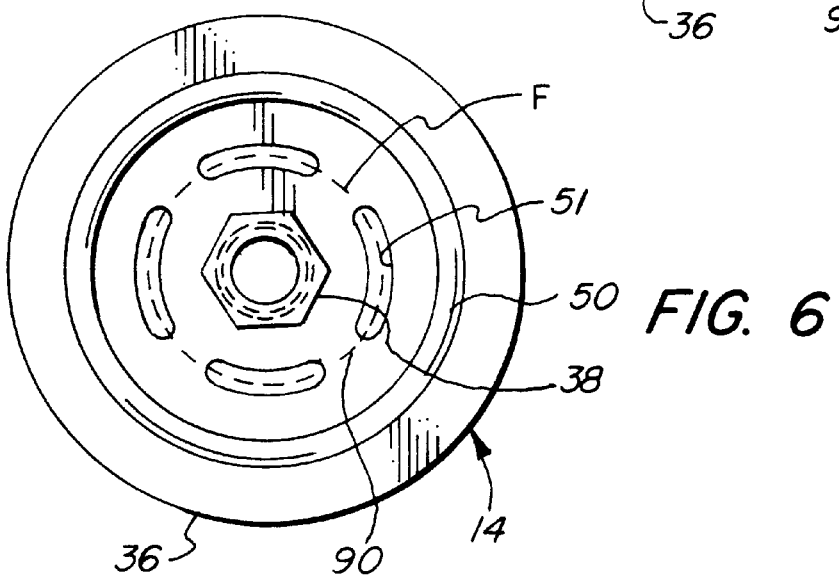
FIG. 6 is an end plan view of an embodiment of the thimble having elongated curved perforations.

Passing through thimble flange 36 between thimble tube 38 and raised ring 50 are a plurality of perforations 51. Although perforations 51 preferably take the form of circular holes (shown in FIGS. 2 and 4), they may be formed as elongated slots (shown in FIG. 5), curved elongated slots (shown in FIG. 6), or any of numerous other shapes. Perforations 51 pass completely through thimble flange 36 and are preferably equally spaced radially about thimble tube 38, although such placement is not required. In different applications, perforations 51 may be interspaced with solid metal webs, or partially drilled, thinned, or otherwise weakened webs.

The thimble is further formed with a tube cylindrical portion 42 extending beyond the hexagonal shoulder portion 40. The thimble tube cylindrical portion 42 has an outer diameter which is less than the outer diameter of the thimble tube hexagonal shoulder 40.

The outer diameter of thimble tube cylindrical portion 42 is less than or equal to the diameter of the circle described by the tips 46 of the tabs of the six tab washer 28. The thimble tube cylindrical portion 42 has an axial length such that when the thimble 14 is inserted into the spacer 12 the cylindrical portion 42 extends beyond the tips 46 of the tabs of the six tab washer 28. The cylindrical portion 42 of the thimble tube has an enlarged end 44. When the thimble tube 38 is inserted into the spacer tube 24 the thimble tube's enlarged end 44 is engaged by the six tab washer 28. The washer tabs 30 are bent away from the spacer tube 24 walls at an angle of approximately 45 degrees to allow the thimble tube's flared end 44 to be easily pressed into the six tab washer 28. The washer is made from a resilient material, such as spring steel or plastic so that the tabs 30 will bend further inwards when the thimble tube's enlarged end 44 passes through the circle described by the tips 46 of the six tab washer 28, yet will return to their original inclination after the thimble tube's flared end 44 has been received by the six tab washer 28. Once inserted, the thimble 14 is prevented from accidental disengagement from the spool 12 by the six tab washer 28 engaging the enlarged end 44.

While the plurality of inward protrusions is described and illustrated as a six tab washer 28, any other method of providing a series of gripping or restraining tabs or surfaces that will allow the easy insertion of the thimble tube 38 into the spacer tube 24 and will lock the thimble tube 38 in place to prevent inadvertent disassembly may be provided. For example, a rubber O-ring could be mounted within the spacer tube 24 to yield a frictional locking effect.

The thimble tube cylindrical portion 42 is further formed with internal threading 48. Internal threading 48 is designed to be tapped into or otherwise engaged by threaded fastener 20. The threaded fastener 20 includes a head 52 configured to be engaged by a tool for applying torque about the fastener axis. For example, the head may be slotted to receive a flat or Philips head screwdriver or may be formed as shown with a hexagonal shape in plan view to provide wrench flats for receiving a wrench. The head 52 is formed with a load bearing surface 54 that extends generally perpendicularly from the fastener axis. The fastener further includes a shank, generally indicated at 56, that extends perpendicularly from the load bearing surface 54 and includes a cylindrical, unthreaded portion 80 and a threaded portion 82 that extends coaxially with the unthreaded portion 80. The threaded portion 82 is adapted to be received by the thimble tube internal threading 48.

The elastically resilient mating rings 16 and 18 are formed from a durable shock absorbing material such as rubber or other polymeric compounds. When the entire isolator is assembled the resilient rings serve to insulate shocks from the support S. The first resilient ring 16 is a round cylinder with an outer diameter equal to the diameter of the spacer flange 22, and has a hole 58 that is centered in the first resilient ring 16. The hole 58 has a diameter equal to the outer diameter of the spacer tube 24. Accordingly, the first resilient ring 16 may be fitted onto spacer tube 24. The first resilient ring 16 further includes a projecting portion 60 formed as an oblong cylinder. The maximum diameter of the projecting portion 60 is less than the diameter of the thimble flange 36. The projecting portion 60 of the first resilient ring 16 is intended to be received by an opening 62 in the body mounting part M. The body mounting part opening 62 therefore must be cut or punched out in the same shape as oblong projecting portion 60 of the first resilient ring 16. The mounting part hole 62 should be slightly larger in size than the projecting portion 60.

The second elastically resilient ring 18 is also formed as a round cylinder, and has a diameter equal to the diameter of the thimble flange 36. The second resilient ring 18 has a hole 64 that is centered in the second resilient ring 18. The hole 64 has a diameter equal to the outer diameter of spacer tube 24, and is the same as the diameter of the hole 58 in the first resilient ring 16. The second resilient ring 18 has at one axial end an oblong cylindrical cavity 66 which receives the first resilient ring projecting portion 60, and should be of the same geometric shape as the projecting portion 60.

The oblong cylindrical projecting portion 60 and the associated body mounting part hole 62 and cavity 66 operate to prevent rotation by the resilient rings relative to the body part and relative to each other. The spool 8 is prevented from rotation relative to the two resilient rings 16 and 18, as well as rotation relative to the body part M by friction between the spacer tube 24 and the first resilient ring hole 58. The thimble 14, being unable to rotate independently from the spacer 12 because of the engagement of the thimble tube hexagonal shoulder 40 and the spacer tube hexagonal portion 26, is similarly prevented from rotation relative to the annular clamping members and the body part M.

In the assembled configuration, as seen in FIG. 1, the spacer 12 rests on the support S. The first resilient ring 16 is mounted on the spacer 12. The body mounting part M is seated on first mating ring 16 and the second resilient ring 18 and the thimble 14 are then mounted over the body part. The entire assembly is secured by the threaded fastener 20. The threaded fastener 20 is inserted through a washer 68 and an opening 70 in the support S up through the center of and coaxially with spacer tube 24. The threaded fastener 20 engages the thimble tube internal threading 48 and when tightened, provides a reliable and secure isolator and fastening assembly.

Perforations 51 passing through thimble flange 36 define a fracture line (illustrated as dashed line F in FIGS. 2, 4, 5 and 6) along the webs 90 of thimble flange 36 between perforations 51. When an impact force is applied which exceeds the separation strength, the forces are concentrated along fracture line F, which results in the fracture of webs 90 potentially allowing for separation of the structure and the support. The separation strength can be selected by varying the size of, number of, position of, shape of, location of, or spacing of the perforations 51. For example, by adding perforations, the amount of material (i.e. the size of webs 90) maintaining the attachment of thimble tube 38 to the majority of thimble flange 36 is reduced, thereby reducing the separation strength of the shock isolating mount. A similar result can be obtained by increasing the size of the perforations or by using elongated perforations.

It has been found that by providing perforations 51, the separation strength of each production unit is much more precise than if perforations are not used. This is so because perforations 51 define a fracture line F, along which each unit will fail. If no perforations are provided, no fracture line is defined, and each production unit may fail along a different fracture line, which may depend on slight variations in material gauge or chemistry, and which may lead to greatly differing separation strengths even among production units of the same configuration.

The present invention, therefore, provides a shock mount which has the capability to be used in both the fixed and breakaway applications described above, which allows for selectivity of the force required for separation, which is economic to produce, and which reliably separates at the desired impact force.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A shock isolating mount for securing a mounting part of a structure onto a support, comprising:

a rigid spacer having a spacer flange and a spacer tube extending from the spacer flange;

a rigid thimble having a thimble flange and a thimble tube projecting from the thimble flange, the thimble tube being integral with the thimble flange and being telescopingly receivable in the spacer tube, the thimble flange having a plurality of perforations passing therethrough surrounding the thimble tube, each of the perforations having a size, shape and location selected to provide the shock isolating mount with a desired separation strength.

2. A shock isolating mount according to claim 1 wherein the perforations comprise a plurality of perforations equally spaced radially about the thimble tube.

3. A shock isolating mount according to claim 2 wherein the plurality of perforations comprise a plurality of circular holes passing through the thimble flange.

4. A shock isolating mount according to claim 2 wherein the plurality of perforations comprise a plurality of elongated holes passing through the thimble flange.

5. A shock isolating mount according to claim 2 wherein the plurality of perforations comprise a plurality of elongated curved holes passing through the thimble flange.

6. A shock isolating mount for securing a mounting part of a structure onto a support, comprising:

a rigid spacer having a spacer flange and a spacer tube extending from the spacer flange;

a rigid thimble having a thimble flange and a thimble tube projecting from the thimble flange, the thimble tube being integral with the thimble flange and being telescopingly receivable in the spacer tube, the thimble flange having a plurality of holes passing therethrough equally spaced radially about the thimble tube, each of the holes having a size, shape and location selected to provide the shock isolating mount with a desired separation strength.

7. In a shock isolating mount for securing a mounting part of a structure onto a support, the shock isolating mount comprising a rigid spacer having a spacer flange and a spacer tube projecting from the spacer flange, and a mating thimble, the improvement wherein the thimble comprises:

a thimble flange;

a thimble tube projecting from said thimble flange, said thimble tube being integral with said thimble flange and being telescopingly receivable in the spacer tube, said thimble flange having a plurality of perforations passing therethrough surrounding the thimble tube, each of the perforations having a size, shape and location selected to provide the shock isolating mount with a desired separation strength.

8. In a shock isolating mount according to claim 7 wherein the perforations comprise a plurality of perforations equally spaced radially about the thimble tube.

9. In a shock isolating mount according to claim 8 wherein the plurality of perforations comprise a plurality of circular holes passing through the thimble flange.

10. In a shock isolating mount according to claim 8 wherein the plurality of perforations comprise a plurality of elongated holes passing through the thimble flange.

11. In a shock isolating mount according to claim 8 wherein the plurality of perforations comprise a plurality of elongated curved holes passing through the thimble flange.

* * * * *